United States Patent [19]

Bergman et al.

[11] Patent Number: 4,923,231
[45] Date of Patent: May 8, 1990

[54] GATE LATCH

[76] Inventors: Kenneth D. Bergman, 2050 Newcosta Ave., Sand Lake, Mich. 49343; Mark C. Bergman, 48 Honeoye, Wyoming, Mich. 49508

[21] Appl. No.: 330,138

[22] Filed: Mar. 29, 1989

[51] Int. Cl.$^5$ .............................................. E05C 3/04
[52] U.S. Cl. .................................... 292/238; 292/205; 292/341.17
[58] Field of Search ................... 292/44, 54, 205, 230, 292/235, 238, 341.17

[56] References Cited

U.S. PATENT DOCUMENTS

| | | | |
|---|---|---|---|
| 484,752 | 10/1892 | Hoffman | 292/341.17 |
| 521,045 | 6/1894 | Rohrbach | 292/238 |
| 1,179,852 | 4/1916 | Louden | 292/230 |
| 1,183,575 | 5/1916 | Longenecker | 292/341.17 |
| 1,221,954 | 4/1917 | Arnold | 292/341.17 |
| 1,482,652 | 2/1924 | Klepper | 292/238 |
| 2,287,710 | 6/1942 | Sayles | 292/341.17 |
| 2,693,043 | 11/1954 | Leake | 292/341.17 |
| 2,860,903 | 11/1958 | Narancich et al. | 292/341.17 |
| 3,733,054 | 5/1973 | Starch . | |
| 3,806,172 | 4/1974 | Maze | 292/44 |
| 3,853,203 | 12/1974 | Werner et al. . | |
| 3,952,453 | 4/1976 | Amburgey . | |
| 4,067,598 | 1/1978 | Mansour . | |
| 4,438,596 | 3/1984 | Jones et al. . | |

FOREIGN PATENT DOCUMENTS 127756 4/1932 Fed. Rep. of Germany ........................ 292/341.17

Primary Examiner—Gary L. Smith
Assistant Examiner—Michael J. Milano
Attorney, Agent, or Firm—Jerry T. Kearns

[57] ABSTRACT

A gate latch for securing a swinging gate to a stationary post includes a generally trapezoidal mounting plate having a three sided rectangular channel member extending laterally outwardly therefrom. A latch bar adapted for securement to the gate is dimensioned for insertion into the channel member for maintaining the gate in a closed position. A pair of pivotal retaining members each have an upper end pivotally mounted adjacent an upper corner at a wide end of the mounting plate and a lower end movable into abutment with one of two parallel side walls within the channel member. A pair of inwardly extending flanges are secured at lower ends of each of the retaining members, forming a V-shaped recess and preventing movement of the latch bar out of the channel member. Outwardly extending handle portions are provided on the retaining members to selectively allow movement of the latch bar out of the channel member in two opposite directions. An inclined ramp may be provided on each of the exterior side wall portions of the channel member to facilitate entry of the latch bar into the channel member. The retaining members may be secured in an open position to allow opening of the gate and a locking pin may be utilized to secure the latch bar within the channel member.

10 Claims, 3 Drawing Sheets

GATE LATCH

BACKGROUND OF THE INVENTION

1. Field of the Invention

The present invention relates to gate latches, and more particularly pertains to an improved gate latch which securely retains a latch bar in a locked position and which may be easily opened to allow the gate to be swung open in either of two opposite directions. The gate latch of the present invention is primarily designed for use with the type of gate utilized on farms and ranches to contain livestock. These gates are frequently pushed against by animals and are subject to considerable forces from wind. Thus, a secure latching mechanism is required which will be resistant to inadvertent opening and which is also easily openable when required. Additionally, it is a great convenience for these gates to be openable in either of two opposite directions, as required. In order to provided these advantages, the present invention discloses a novel gate latch of a simple construction which provides a secure latching mechanism which allows a gate to be opened in opposite directions.

2. Description of the Prior Art

Various types of gate latches are known in the prior art. A typical example of such a gate latch is to be found in U.S. Pat. No. 3,733,054, which issued to B. Storch on May 15, 1973. This patent discloses a safety fence including a plurality of posts having brackets and telescoping rails which are coupled to and supported by the brackets. A latching mechanism is provided for securing the members in aligned relation. U.S. Pat. No. 3,853,203, which issued to R. Werner et al on Dec. 10, 1974, discloses a supporting scaffold structure utilizing a special bracket to retain a toeboard to a supporting stage independently of any hand rail. U.S. Pat. No. 3,952,453, which issued to O. Amburgey on Apr. 27, 1976, discloses a portable safety barrier having a selectively openable barrier retained in a closed position by a latch mechanism. U.S. Pat. No. 4,067,598, which issued to G. Mansour on Jan. 10, 1978, discloses a mechanical security device or door guard in the form of an elongated latching member arranged to extend laterally across and in close proximity to a door when closed for positively maintaining the door in a closed position. One end of the latching member is pivotally connected to a vertical door jam located adjacent the edge of the door provided with the handle and the other end of the latching member is removably received by a generally J-shaped clip carried by the other vertical door jam to which the door is hingedly connected. U.S. Pat. No. 4,438,596, which issued to J. Jones et al on Mar. 27, 1984, discloses a removable safety barricade having a gate secured by a latching mechanism having a single pivotal retaining member biased by a spring to a closed position to secure a latch bar within a channel member. The latching mechanism allows opening of the gate in only one direction.

While the above mentioned devices are directed to gate latches, none of these devices disclose a gate latch having a pair of pivotal retaining members for retaining a latch bar within a channel member and including handle portions for selectively opening the retaining members to allow opening of the gate in either of two opposite directions. Inasmuch as the art is relatively crowded with respect to these various types of gate latches, it can be appreciated that there is a continuing need for and interest in improvements to such gate latches, and in this respect, the present invention addresses this need and interest.

SUMMARY OF THE INVENTION

In view of the foregoing disadvantages inherent in the known types of gate latches now present in the prior art, the present invention provides an improved gate latch. As such, the general purpose of the present invention, which will be described subsequently in greater detail, is to provide a new and improved gate latch which has all the advantages of the prior art gate latches and none of the disadvantages.

To attain this, representative embodiments of the concepts of the present invention are illustrated in the drawings and make use of a gate latch for securing a swinging gate to a stationary post including a generally trapezoidal mounting plate having a three sided rectangular channel member extending laterally outwardly therefrom. A latch bar adapted for securement to the gate is dimensioned for insertion into the channel member for maintaining the gate in a closed position. A pair of pivotal retaining members each have an upper end pivotally mounted adjacent an upper corner at a wide end of the mounting plate and a lower end movable into abutment with one of two parallel side walls within the channel member. A pair of inwardly extending flanges are secured at lower ends of each of the retaining members, forming a V-shaped recess and preventing movement of the latch bar out of the channel member. Outwardly extending handle portions are provided on the retaining members to selectively allow movement of the latch bar out of the channel member in two opposite directions. An inclined ramp may be provided on each of the exterior side wall portions of the channel member to facilitate entry of the latch bar into the channel member. The retaining members may be secured in an open position to allow opening of the gate and a locking pin may be utilized to secure the latch bar within the channel member.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved gate latch which has all the advantages of the prior art gate latches and none of the disadvantages.

It is another object of the present invention to provide a new and improved gate latch which may be easily and efficiently manufactured and marketed.

It is a further object of the present invention to provide a new and improved gate latch which is of a durable and reliable construction.

An even further object of the present invention is to provide a new and improved gate latch which is susceptible of a low cost of manufacture with regard to both materials and labor, and which accordingly is then susceptible of low prices of sale to the consuming public, thereby making such gate latches economically available to the buying public.

Still yet another object of the present invention is to provide a new and improved gate latch which provides in the apparatuses and methods of the prior art some of the advantages thereof, while simultaneously overcoming some of the disadvantages normally associated therewith.

Still another object of the present invention is to provide a new and improved gate latch for securing a latch bar within a channel member and allowing opening of a gate in two opposite directions.

Yet another object of the present invention is to provide a new and improved gate latch of a simple and economical construction which prevents inadvertent opening of the gate and allows swinging of the gate in two opposite directions.

Even still another object of the present invention is to provide a new and improved gate latch which may be selectively configured to allow free swinging opening of the gate or for requiring manual opening of a retaining member.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
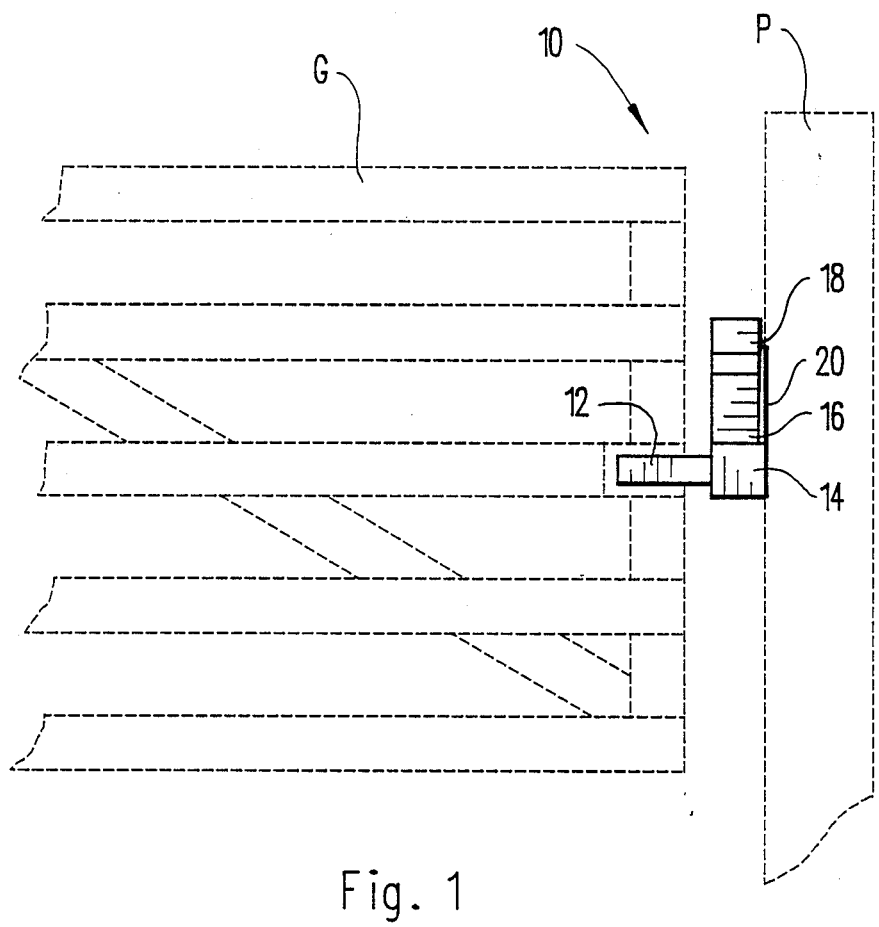
FIG. 1 is a side view illustrating the gate latch according to the first embodiment of the present invention installed on a swingable gate and stationary post.

With reference now to the drawings, and in particular to FIG. 1 thereof, a new and improved gate latch embodying the principles and concepts of the present invention and generally designated by the reference numeral 10 will be described.

More specifically, it will be noted that the first embodiment 10 of the invention includes a transversely extending latch bar 12 adapted for securement on a conventional free swinging gate G. The latch bar 12 is secured to the free end of the gate G and is received in a latched position within a channel member 14 which extends laterally outwardly from a mounting plate 20 which is secured on a conventional fence post P. A pivotal retaining member 16 includes a handle portion 18 for manually opening the retaining member 16.

Figure 2:
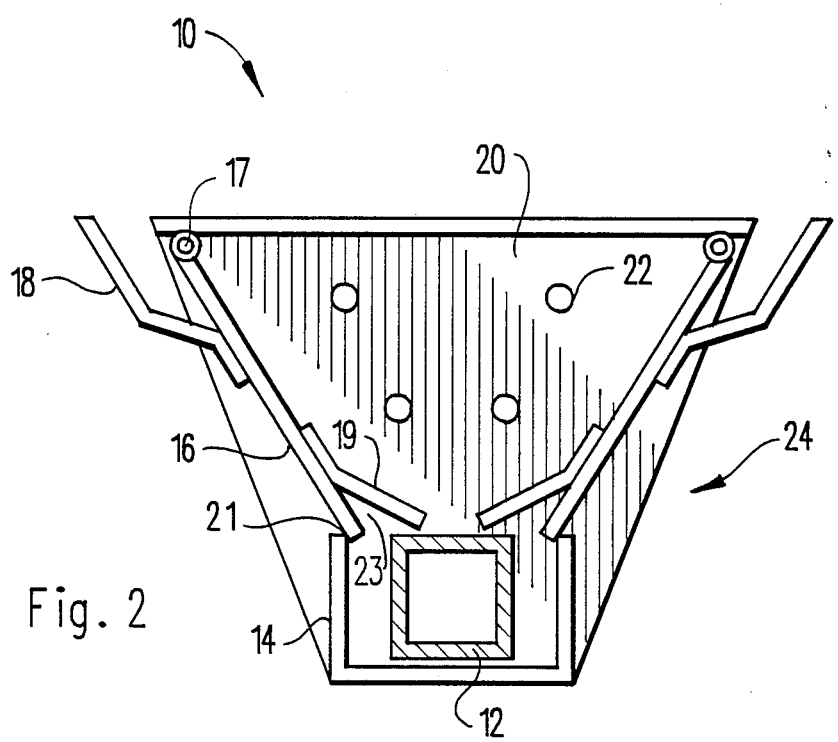
FIG. 2 is a front view illustrating the gate latch according to the first embodiment of the present invention with the latch bar secured in a latched position.

FIG. 2 is a front view of the gate latch 10 illustrating the generally trapezoidal mounting plate 20 which includes a plurality of apertures 22 to enable securement of the mounting plate 20 to a fence post utilizing nails or screws. A three sided rectangular channel member 14 has vertically upstanding parallel side walls which form a rectangular channel dimensioned for reception of the latch bar 12, which is secured to the free end of the swingable gate. A pair of retaining members 16 and 24 each have an upper end secured for pivotal movement by a hinge 17 at opposite corners at the wide end of the trapezoidal mounting plate 20. The retaining members 16 and 24 are of mirror symmetrical construction and the COnstructional details will be described only with respect to the retaining member 16. The bottom end 21 of the retaining member 16 is dimensioned for abutment with an interior side wall portion within the channel member 14. A downwardly and inwardly extending flange 19 is secured adjacent the end 21 and forms a V-shaped recess 23 which is dimensioned for engagement with the corner portion of the generally rectangular latch bar 12. Upon attempted upward movement of the latch bar 12, the flanges 19 of the retaining members 16 and 24 engage the upper corner portions and top surface of the latch bar 12, preventing movement of the latch bar 12 out of the channel member 14. Thus, the latch bar 12 is securely retained within the interior of the channel member 14. The retaining members 16 and 24 may include a torsional coil spring disposed around the hinge 17, as for example of the type disclosed in U.S. Pat. No. 4,438,596, the disclosure of which is hereby incorporated by reference. Alternatively, as illustrated, the coil spring may be omitted because the latch members 16 and 24 will fall to the illustrated closed position by virtue of gravity alone. An outwardly extending handle portion 18 is provided on an exterior surface of each of the retaining members to allow inward and upward pivotal movement to allow selective withdrawal of the latch bar 12 from the channel member 14. Depending on the side of the gate from which an individual is approaching, either of the retaining members 16 or 24 may be opened, thus allowing the gate to be swung open in either of two opposite directions.

Figure 3:
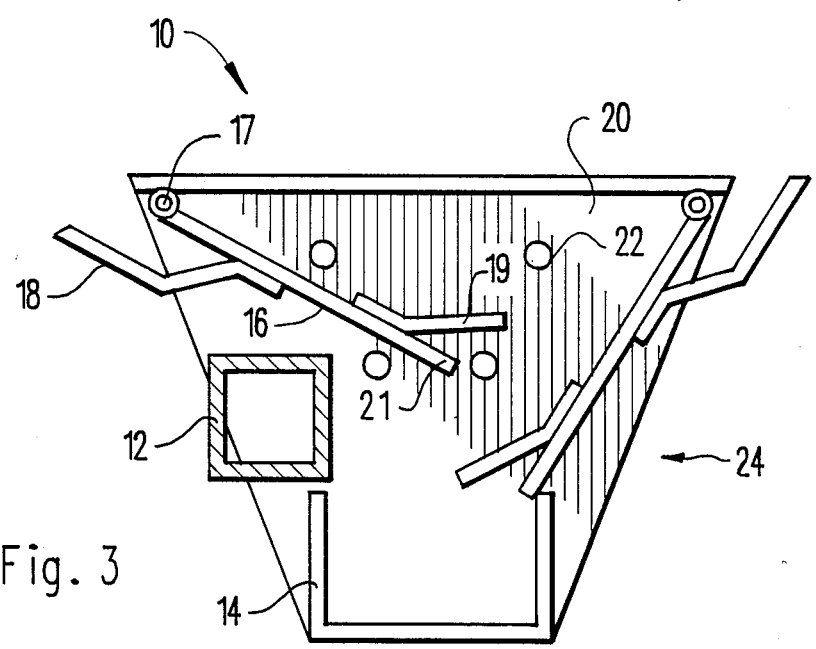
FIG. 3 is a front view illustrating the manner of use of the latch of FIG. 2.

FIG. 3 illustrates the retaining member 16 in an open position, allowing withdrawal of the latch bar 12 from within the channel member 14.

Figure 4:
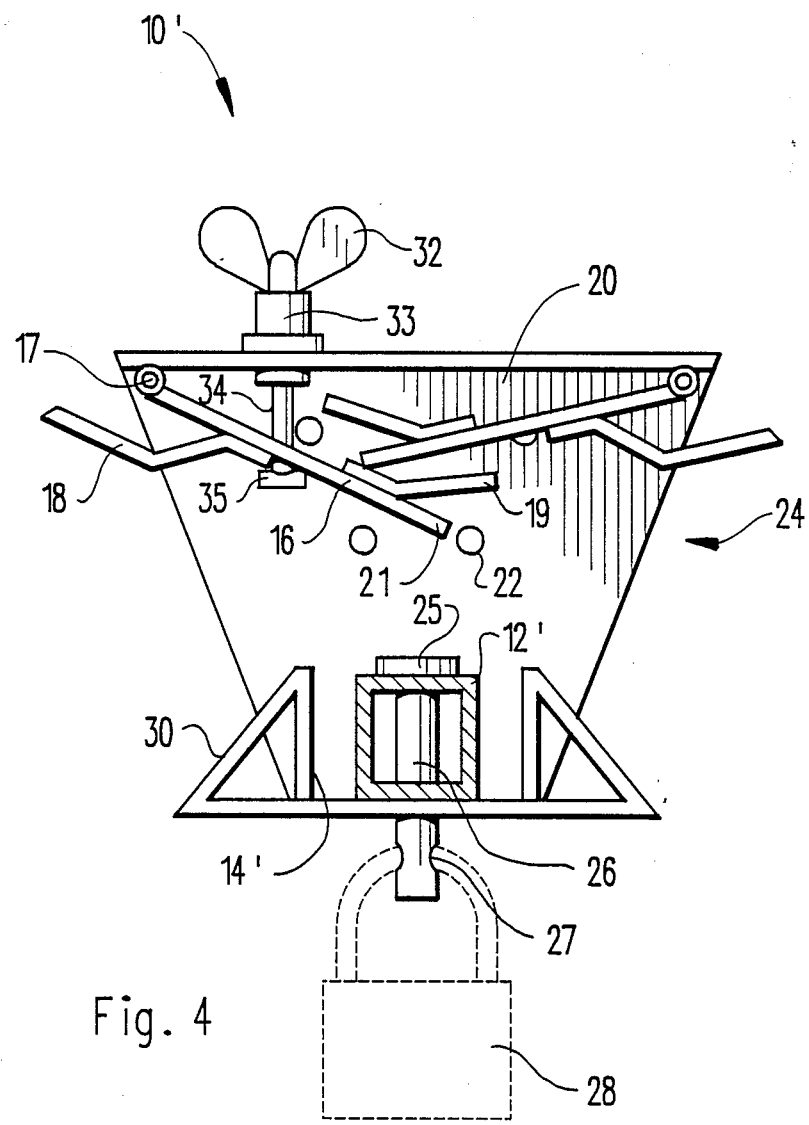
FIG. 4 is a front view, illustrating a slightly modified gate latch according to a second embodiment of the present invention.

FIG. 4 illustrates a second embodiment 10' of the present invention in which an inclined ramp surface 30 is provided at each of the exterior parallel side walls of the channel member 14, to facilitate insertion of the latch bar 12'. As the gate is swung to a closed position, the latch bar 12' will move upwardly along the ramp 30 and fall into the interior of the channel member 14. When it is desired to allow free opening of the gate without requiring manipulation of either of the retaining members 16 and 24, a mechanism is provided for securing both of the retaining members 16 and 24 in an open position. A rotary bearing nut 33 secures a shaft 34 to an upper transverse ledge portion of the mounting plate 20. The shaft 34 is connected for rotation by a wing portion 32. An enlarged transverse head 35 is secured at the distal end of the shaft 34 and is dimensioned to be received through an elongated slot formed in the retaining member 16. By aligning the enlarged head 35 with the slot, the retaining member 16 may be moved to a closed position. By orienting the head 35 transversely to the longitudinal axis of the elongated slot in the retaining member 16, the retaining member 16 may be retained in the illustrated open position. The retaining member 24 will also be retained in the open position by virtue of engagement with the retaining member 16. A locking pin 26 including an enlarged head portion 25 may be inserted through aligned apertures in the latch bar 12' and the channel member 14' to enable the gate to be locked in a closed position. A conventional padlock 28 may be engaged through a transverse aperture 27 provided at the lower end portion of the locking pin 26.

The various components of the gate latch of the present invention are preferably formed from a hardened corrosion resistant steel which may be suitably painted or surface plated to provide for a long service life. As may now be understood, the present invention provides an extremely simple, economical gate latch which is resistant to unintentional opening while at the same time allowing a gate to be easily opened in either of two opposite directions.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A gate latch for use with a gate having a free end mounted for swinging movement relative to a stationary post, comprising:
    a latch bar adapted for securement on said gate;
    a mounting plate adapted for securement on said post;
    a channel member dimensioned to receive said latch bar on said mounting plate;
    selectively releasable retaining means for retaining said latch bar in said channel member and allowing said latch bar to be moved out of either side of said channel member; and
    a locking pin selectively receivable through aligned apertures in said latch bar and said channel member.

2. The gate latch of claim 1, wherein said retaining means comprises a pair of retaining members each having an upper end pivotally mounted on said mounting plate, above said channel member and a lower end dimensioned for abutment with interior side walls of said channel member.

3. The gate latch of claim 3, further comprising a pair of inwardly extending flanges secured adjacent lower ends of each of said retaining members, each of said flanges forming a V-shaped recess and preventing movement of said latch bar out of said channel member.

4. The gate latch of claim 3, further comprising a pair of outwardly extending handle portions on said retaining members for inwardly pivoting said retaining members to allow movement of said latch bar out of said channel member and allowing opening of said gate in two opposite directions.

5. The gate latch of claim 3, further comprising means for maintaining said retaining members in an open position.

6. The gate latch of claim 1, further comprising an inclined ramp on two opposite exterior sides of said channel member to facilitate movement of said latch bar into said channel member.

7. A gate latch for use with a gate having a free end mounted for swinging movement relative to a stationary post, comprising:
    a latch bar adapted for securement on said gate;
    a generally trapezoidal mounting plate including means for securement on said post;
    a three sided rectangular channel member extending laterally outwardly at a narrow end of said mounting plate, said channel member dimensioned to receive said latch bar and having a pair of spaced parallel side walls;
    a pair of retaining members each having an upper end pivotally mounted at spaced upper corners of a wide end of said mounting plate and a lower end dimensioned for abutment with one of said parallel side walls, inside said channel member;
    a pair of inwardly extending flanges secured adjacent lower ends of each of said retaining members, said flanges each forming a V-shaped recess and preventing movement of said latch bar out of said channel member;
    a pair of outwardly extending handle portions on said retaining members for inwardly swinging said retaining members to allow movement of said latch bar out of said channel member and allowing opening of said gate latch in two opposite directions; and
    a locking pin selectively receivable through aligned apertures in said latch bar and said channel member.

8. The gate latch of claim 7, further comprising an inclined ramp on two opposite exterior sides of said channel member to facilitate movement of said latch bar into said channel member.

9. The gate latch of claim 7, further comprising means for maintaining said retaining members in an open position.

10. A gate latch for use with a gate having a free end mounted for swinging movement relative to a stationary post, comprising:
- a latch bar adapted for securement on said gate;
- a mounting plate adapted for securement on said post;
- a channel member dimensioned to receive said latch bar on said mounting plate;
- an inclined ramp on two opposite exterior sides of said channel member to facilitate movement of said latch bar into said channel member;
- a pair of retaining members each having an upper end pivotally mounted on said mounting plate, above said channel member and a lower end dimensioned for abutment with interior side walls of said channel member for retaining said latch bar in said channel member and allowing said latch bar to be moved out of either side of said channel member;
- a pair of outwardly extending handle portions on said retaining members for inwardly pivoting said retaining members to allow movement of said latch bar out of said channel member and allowing opening of said gate in two opposite directions; and
- a pair of downwardly and inwardly extending flanges secured adjacent lower ends of each of said retaining members, each of said flanges forming a V-shaped recess dimensioned for engagement with a corner portion of said latch bar for preventing movement of said latch bar out of said channel member.

* * * * *